US010243764B2

(12) United States Patent
Lindoff et al.

(10) Patent No.: US 10,243,764 B2
(45) Date of Patent: Mar. 26, 2019

(54) METHOD AND DEVICE FOR D2D COMMUNICATION WITHIN A CELLULAR RADIO NETWORK

(71) Applicant: Telefonaktiebolaget LM Ericsson (Publ), Stockholm (SE)

(72) Inventors: Bengt Lindoff, Bjärred (SE); Fredrik Gunnarsson, Linköping (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/024,272

(22) PCT Filed: Oct. 29, 2014

(86) PCT No.: PCT/EP2014/073267
§ 371 (c)(1),
(2) Date: Mar. 31, 2016

(87) PCT Pub. No.: WO2015/063186
PCT Pub. Date: May 7, 2015

(65) Prior Publication Data
US 2016/0234045 A1    Aug. 11, 2016

Related U.S. Application Data

(60) Provisional application No. 61/898,178, filed on Oct. 31, 2013.

(51) Int. Cl.
*H04B 7/00* (2006.01)
*H04L 25/03* (2006.01)
(Continued)

(52) U.S. Cl.
CPC ....... *H04L 25/03866* (2013.01); *H04W 76/14* (2018.02); *H04W 88/06* (2013.01)

(58) Field of Classification Search
CPC ... H04W 76/023; H04W 8/005; H04W 48/16; H04W 56/002; H04W 72/042;
(Continued)

(56) References Cited

U.S. PATENT DOCUMENTS

2004/0128589 A1* 7/2004 Lewis ................... H04L 1/0041
714/700
2011/0317780 A1* 12/2011 Kang .................... H04L 5/0007
375/260
(Continued)

OTHER PUBLICATIONS

International Search Report and Written Opinion dated Feb. 3, 2015 for International Application Serial No. PCT/EP2014/073267, International Filing Date—Oct. 29, 20145 consisting of 14-pages.
(Continued)

*Primary Examiner* — Ajibola A Akinyemi
(74) *Attorney, Agent, or Firm* — Christopher & Weisberg, P.A.

(57) ABSTRACT

A method of and device for generation and transmission of a first data message over a wireless channel and for a device-to-device enabled cellular communication device arranged to operate with a cellular radio access network. A transmitter identification, ID, of the cellular communication device in the first data message is included The entire first data message, including at least data associated with the transmitter ID is scrambled with a scrambling sequence associated with a synchronization source identity. The first data message is transmitted over the wireless channel. A corresponding method of and device for receiving and decoding one or more data messages over a wireless channel and for a device-to-device enabled cellular communication device arranged to operate with a cellular radio access network. A first synchronization source identity is determined. A received first data message with a scrambling sequence associated with the first synchronization source
(Continued)

identity is descrambled. The received first data message is decoded. A transmission identity, ID, is determined from the first data message.

20 Claims, 4 Drawing Sheets

(51) Int. Cl.
    *H04W 88/06*     (2009.01)
    *H04W 76/14*     (2018.01)
(58) Field of Classification Search
    CPC ... H04W 56/001; H04W 64/00; H04W 72/02; H04W 72/0406; H04W 76/021; H04W 76/046; H04W 84/042; H04W 16/14; H04W 40/244; H04W 40/246; H04W 48/08; H04W 4/08
    USPC ........................................................ 455/41.2
    See application file for complete search history.

(56) References Cited

U.S. PATENT DOCUMENTS

| | | | |
|---|---|---|---|
| 2013/0201954 A1 | 8/2013 | Gao et al. | |
| 2014/0120934 A1* | 5/2014 | Kishiyama | H04W 76/14 |
| | | | 455/452.1 |

OTHER PUBLICATIONS

3GPP TSG RAN WG1 Meeting #68, R1-120272, Title: "Scrambling Sequences for Enhanced PDCCH", Agenda Item: 7.6.1., Source: Apple Inc., Document for Discussion/Decision, Conference Location and Date: Dresden, Germany, Feb. 6-10, 2012 consisting of 6-pages.

3GPP TR 22.803 V12.2.0 (Jun. 2013) 3rd Generation Partnership Project; Technical Specification Group Services and System Aspects; Feasibility study for Proximity Services (ProSe) (Release 12) Jun. 28, 2013 consisting of 45-pages.

3GPP TSG RAN WG1 Meeting #74bis, R1-134972, Title: "Chairman's Notes of Agenda Item 7.2.8: Study on LTE Device to Device Proximity Services", Agenda Item: 7.2.8., Source: Session Chairman (Alcatel-Lucent), Document for Endorsement, Conference Location and Date: Guangzhou, China, Oct. 7-11, 2013 consisting of 8-pages.

3GPP TSG RAN WG1 Meeting #74bis, R1-134704, Title: "On D2D Broadcast Communication Procedures", Agenda Item: 7.2.8.1, Source: Ericsson, Document for Discussion and Decision, Conference Location and Date: Guangzhou, China, Oct. 7-11, 2013 consisting of 4-pages.

3GPP TSG RAN WG1 Meeting #75, R1-135805, Title: "On Scrambling of D2D Physical Channels", Agenda Item: 6.2.8.1.2, Source: Ericsson., Document for Discussion and Decision, Conference Location and Date: San Francisco, CA USA, Nov. 11-15, 2013 consisting of 6-pages.

* cited by examiner

METHOD AND DEVICE FOR D2D COMMUNICATION WITHIN A CELLULAR RADIO NETWORK

TECHNICAL FIELD

The present invention generally relates to a method of generation and transmission of a first data message over a wireless channel and for a device-to-device enabled cellular communication device arranged to operate with a cellular radio access network, and a method of receiving and decoding one or more data messages over a wireless channel and for a device-to-device enabled cellular communication device arranged to operate with a cellular radio access network, and to such a communication device, and a computer program for implementing the methods.

BACKGROUND

In a cellular deployment, scrambling sequences are controlled by the eNodeB such that both the User Equipment, UE, and the eNodeB always know what scrambling sequence is applied by each LIE and for each channel and resource. However, for device-to-device, D2D, communication, a central node performing scheduling and controlling all UEs in proximity is lacking, e.g., for Out of network Coverage, OoC. Furthermore, UEs in proximity might be controlled by different eNodeBs or control nodes. Because of the above, UEs may be unaware of the scrambling sequences used by neighbor UEs when transmitting their channels/signals.

In 3GPP LTE, the device only needs to de-scramble sequences form the serving cell. D2D broadcast communication introduce some new aspects of the lower layer scrambling, mainly how to handle—from a device complexity point of view—the case of a device OoC and capable to receive D2D broadcast communication, or a D2D discovery signal. A device OoC may not have information of scrambling sequences used for the D2D broadcast communication and in order to reduce such device scrambling search space an efficient scrambling procedure is needed. Furthermore in D2D communication a device should also be able to receive broadcast communication from other devices in another cell than the receiving device. This put also requirements on the device to be able to descramble sequences for many different cells, and an exhaustive search over all potential scrambling sequences is very complex.

Therefore there is a need for methods and apparatus for efficient scrambling identification while still fulfilling the requirements of randomized sequences and identification of sequences destined for a particular device.

SUMMARY

Some embodiments intend to solve the problem of how to scramble/descramble sequences such that the device easily can, in a low complexity way, identify the scrambled sequence used and hence decode the message while still having randomized scrambling behavior.

Some embodiments are based on the understanding that proper scrambling/descrambling can be achieved by transmitting a first D2D message from a first device with a first identity, the message includes at least an identity of the synchronization source used by the first transmitting device, and the message is scrambled with a scrambling sequence associated with a synchronization source used by the transmitting device, whereby the receiving entity can identify information from which it can associate the correct scrambling sequence for descrambling.

According to a first aspect, there is provided a method of generation and transmission of a first data message over a wireless channel and for a device-to-device enabled cellular communication device arranged to operate with a cellular radio access network. The method comprises including a transmitter identification, of the cellular communication device in the first data message; scrambling the entire first data message, including at least data associated with the transmitter ID, with a scrambling sequence associated with a synchronization source identity; and transmitting the first data message over the wireless channel.

The synchronization source may be a controlling node to which the cellular communication device is associated by the cellular communication device is camping on the controlling node, is served by the camping node or controlled by the controlling node.

The synchronization source may be the cellular communication device. The first data message may be transmitted at predetermined frequency/time resources.

The scrambling sequence associated with a synchronization source identity may be derived from a Primary Synchronization Source Identity, PSSID.

The method may further comprise scrambling a checksum associated with the first data message, wherein the scrambling of the checksum may be made with a scrambling sequence associated with and identity of a receiver of the first data message; and then performing the scrambling of the entire first message. The checksum may be a cyclic redundancy check. The identity of the receiver may be either received from the first synchronization source or preconfigured.

The method may further comprise scrambling a second data message with a sequence associated with the transmitter ID of the cellular communication device; and transmitting the second data message over the wireless channel.

The method may further comprise, prior to any transmission of the data message or messages, transmitting a synchronization sequence, wherein the synchronization sequence may be associated with an identity of the synchronisation source.

The data message or messages may be transmitted at frequency/time resources assigned by the synchronization source.

The data message or messages may be a scheduling assignment message for device-to-device communication.

The cellular radio access network may be a 3GPP LTE cellular radio access network.

According to a second aspect; there is provided a method of receiving and decoding one or more data messages over a wireless channel and for a device-to-device enabled cellular communication device arranged to operate with a cellular radio access network. The method comprises determining a first synchronization source identity; descrambling a received first data message with a scrambling sequence associated with the first synchronization source identity; decode the received first data message; and determining a transmission identity, ID, from the first data message.

The decoding of the first data message may comprise descrambling a checksum with a sequence associated with the receiver identity.

The method may further comprise descrambling a second data message with a scrambling code associated with the determined transmission ID.

The receiver identity may be determined from preconfigured capability of the cellular communication device.

The receiver identity may be received from a second synchronization source.

The first and second synchronization sources may be idem.

The method may further comprise, prior to any reception of the data message or messages, receiving a synchronization sequence, wherein the synchronization sequence may be associated with an identity of the first synchronization source, wherein the determining of the first synchronization source identity is based on the synchronization sequence.

According to a third aspect, there is provided a communication device for operating with a cellular radio access network and enabled for device-to-device communication. The communication device comprises a transceiver arranged to transmit or receive one or more data messages over a wireless channel; and a controller arranged to generate or decode one or more data messages according to the first and/or the second aspect.

According to a fourth aspect, there is provided a computer program comprising instructions which, when executed on a processor of a communication device, causes the communication device to perform the method according to the first and/or second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Some Abbreviations
 FDD Frequency Division Duplex
 TDD Time Division Duplex
 UL Uplink
 DL Downlink
 NW Network
 RRC Radio Resource Controller
 SIR Signal-to-Interference Ratio
 SINR Signal-to-Interference-and-Noise-Ratio
 SIM Subscriber Identification Module
 TX Transmitter
 RX Receiver
 TRX Transceiver
 UE User Equipment
 RNTI Radio Network Temporary Identifier
 CRC Cyclic Redundancy Check
 PDCCH Physical Downlink Control Channel
 PDSCH Physical Downlink Synchronization Channel
 ID Identifier
 XOR eXclusive-OR Other abbreviations are explained as they appear throughout the text.

Although the approach of enabling D2D communications as a means of relaying in cellular networks was proposed by some early works on ad hoc networks, the concept of allowing local D2D communications to (re)use cellular spectrum resources simultaneously with on-going cellular traffic is relatively new. Because the non-orthogonal resource sharing between the cellular and the D2D layers has the potential of the reuse gain and proximity gain at the same time increasing the resource utilization, D2D communications underlying cellular networks has received considerable interest in the recent years.

Specifically, in 3GPP LTE networks, such LTE Direct (D2D) communication can be used in commercial applications, such as cellular network offloading, proximity based social networking, or in public safety situations in which first responders need to communicate with each other and with people in the disaster area which is addressed in the feasibility study of 3GPP TR 22.803.

D2D communication entities using an LTE Direct link may reuse the same physical resource blocks (PRB), i.e. frequency/time (f/t) resources, as used for cellular communications either in the downlink or in the uplink or both. The reuse of radio resources in a controlled fashion can lead to the increase of spectral efficiency at the expense of some increase of the intra-cell interference. Typically, D2D communicating entities use UL resources such as UL PRBs or UL time slots, but conceptually it is possible that D2D, e.g. LTE Direct, communications takes place in the cellular DL spectrum or in DL time slots. For ease of presentation, in the present disclosure we assume that D2D links use uplink resources, such as uplink PRBs in an FDD or uplink time slots in an a cellular TDD system, but the approaches would carry over to cases in which D2D communications take place in DL spectrum as well.

Figure 1:
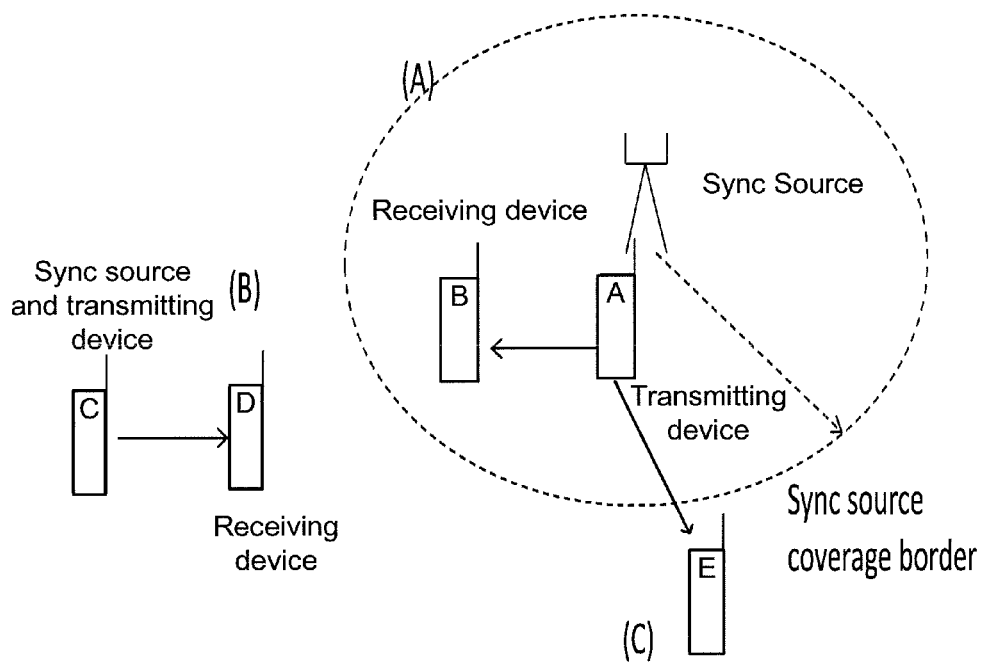
FIG. 1 shows some general D2D broadcast communication scenarios.

D2D communication in LTE should work in several scenarios. FIG. 1 shows some general D2D broadcast communication scenarios which should be able to operate in. FIG. 1 also shows a first embodiment of the invention related to a transmitting device (may also be UE, modem, sensor, smart phone, M2M type, Laptop, etc.). Note that in all cases the communication may be on the same frequency carrier. Hence the out of network coverage case may use a subset of the f/t resources the controlling node use for cellular (and NW assisted D2D) communication.

However, several problems may be envisioned by use of the resources, for instance:

A. The communicating devices are inside coverage of a controlling node, acting as a synchronization source. The controlling node may be an eNode B or a UE assuming the control role (Cluster Head). In this case the controlling node allocates the resources use for the communication.

B. All devices are outside NW coverage. In this case one of the devices is a controlling node (i.e. Cluster Head) controlling the resource allocation for the communication. The cluster head acts as a synchronization source C. Some devices are in NW/CH coverage and some are outside. In this case, the NW/CH node is the controlling node and the synchronization source. An in-coverage UE may relay the controlling node synch signal and optionally synch and broadcast information from the controlling node to out-of-coverage UEs. In this case, the synchronization source identifier and associated sequence is used also by the relay UE. The synchronization source identity may sometimes be referred to as physical layer sidelink synchronization identity.

In addition to the broadcast communication application described above, additional applications may be implemented by D2D, both in coverage (IC) and out of coverage (OoC). In particular, this may apply for unicast communication where a certain transmission targets a specific receiver, and multicast communication where a specific data transmission targets a set of receivers.

Additionally, proximity detection may be achieved by D2D by periodically transmitting discovery beacons, i.e., messages carrying at least a transmitter identity. By successfully detecting such messages, a receiver may be aware of which other UEs that are in proximity. Proximity detection is often termed as discovery.

Lower layer scrambling of data channels in LTE is used for several purposes. First the physical channel (e.g. PDCCH/PDSCH) itself may be scrambled based on the transmitting eNodeB cell Identity. The main use of this scrambling is for randomization and interference reduction purposes. The scrambling of the physical channels may be determined by the receiving device based on cell ID information that is determined in the cell search process, i.e. from the primary and secondary synchronization channels (PSS/SSS).

Furthermore, in LTE there is also scrambling of the CRC of the PDCCH, that scrambling may be based on the RNTI. The PDCCH CRC scrambling is used in order to determine which PDCCH that is allocated for a specific device. The device receives the RNTI information from the serving or camping cell, and hence has knowledge of which scrambling sequences to apply on the CRC for decoding the PDCCH allocated to the device.

Figure 2:
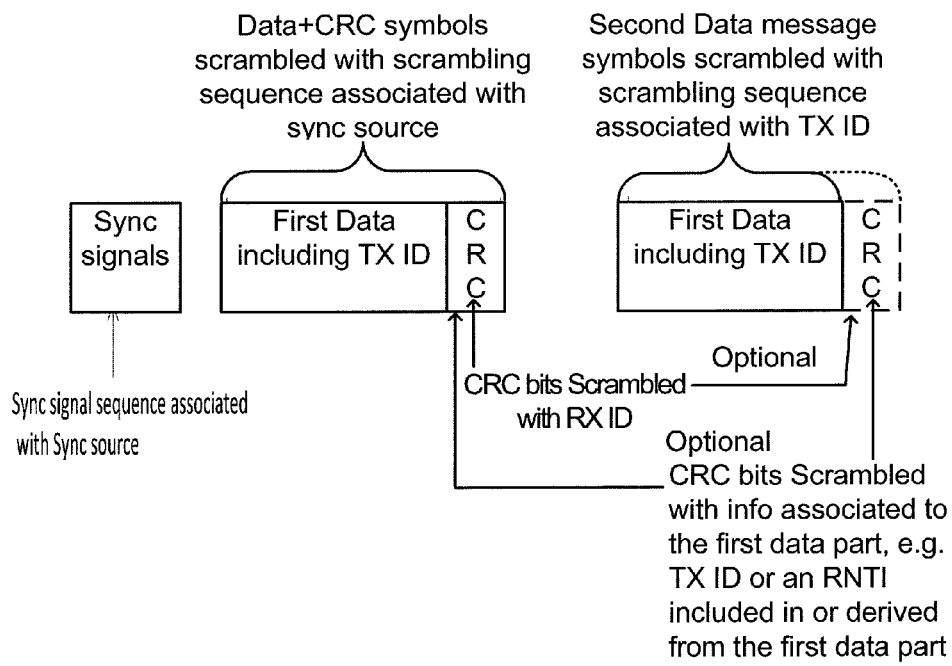
FIG. 2 is a flow chart illustrating a method according to an embodiment.

An approach is to transmit a first D2D message from a first device with a first identity, the message includes at least an identity of the synchronization source used by the first transmitting device, and the message is scrambled with a scrambling sequence associated with a synchronization source used by the transmitting device. The synchronization source may be the serving cell, another UE (cluster head) controlling the first device, or the first device itself. Furthermore prior to transmission of first message a synchronization signal sequence associated with the synchronization source may be transmitted. Furthermore a checksum of the first message may be scrambled by a sequences associated with a receiving device. Furthermore, a second message may be transmitted from the first transmitting device, the second message scrambled by a scrambling sequence associated with the transmitting device identity. A receiving device receiving and de-scrambling the D2D message(s) is disclosed. The basic principles of the approach are also disclosed in FIG. 2, which is a signal scheme. The signal scheme indicates a first data message including TX ID, with optional CRC scrambled with a scrambling sequence associated with RX ID, scrambled with a sequence associated with a synchronization source. The signal scheme also indicates an optional second data message, also with an optional CRC scrambled with a scrambling sequence associated with RX ID, scrambled with a sequence associated with TX ID. The signal scheme also indicates a synchronization sequence which is associated with an identity of the synchronization source.

Figure 3:
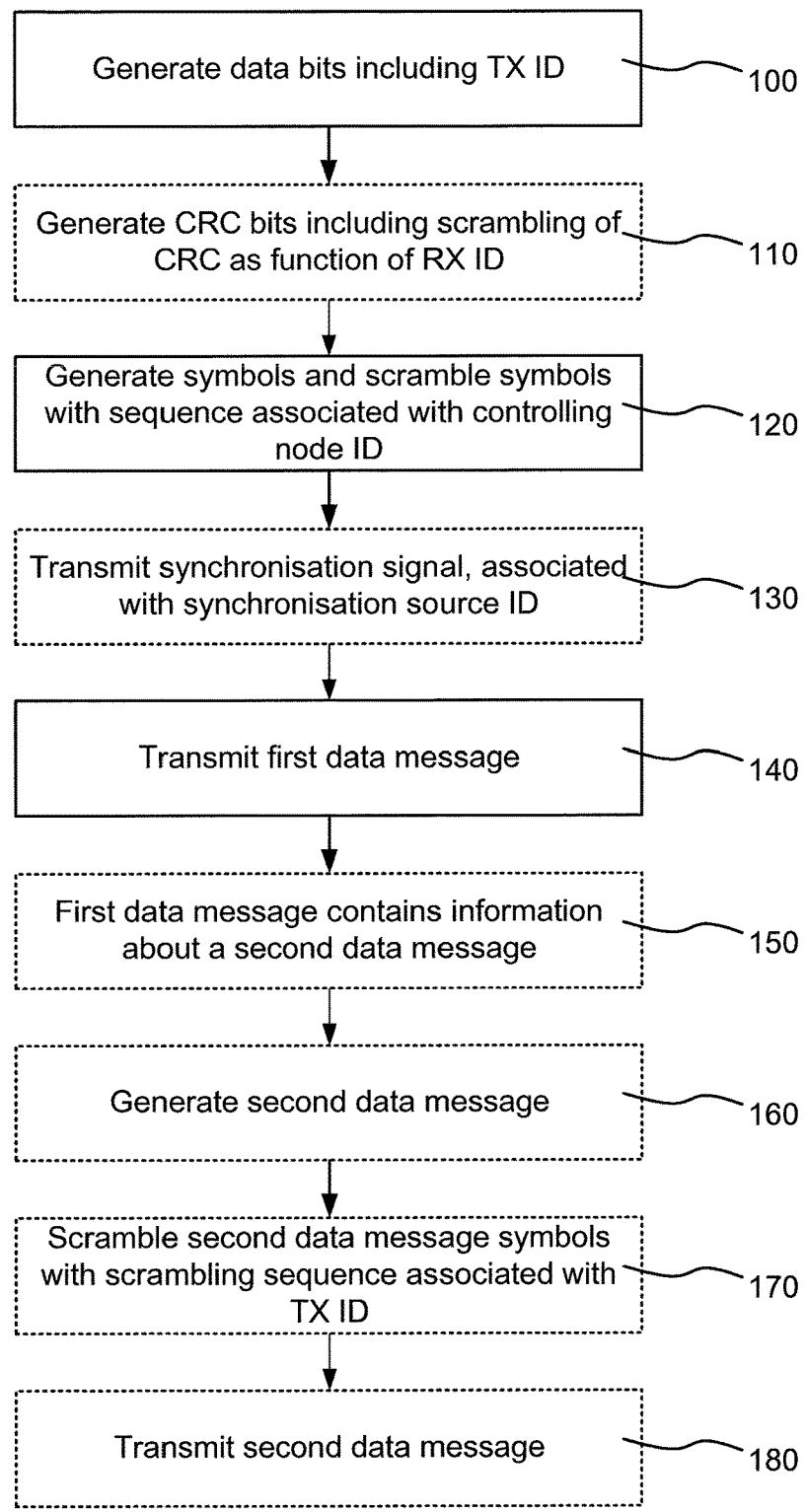
FIG. 3 is a flow chart illustrating methods according to embodiments for the transmitter side.

FIG. 3 is a flow chart illustrating methods according to embodiments. Hashed boxes indicate optional steps. A data bit generation step 100 generates data bits including TX ID. Thus, the transmitting device generated data bits to be transmitted, and the data bits at least including a synchronization source identity associated to the transmitting device are generated. The synchronization source identity may sometimes be referred to as physical layer sidelink synchronization identity. Optionally, CRC bits (checksum) are generated 110 based on the transmitted data bits, and the CRC bits are scrambled, e.g. XOR scrambling typically, but not limited to, with a bit sequence associated with the receiver identity RX ID. For example, 16 bits may be used for the CRC. Typically, the scrambling is based on an RNTI value. The RNTI may be a broadcast RNTI, known to all devices capable to receive D2D communication in LTE. It may also be a group RNTI known to a subset of D2D capable devices. It may furthermore be a unicast RNTI, known only by a single D2D device. It may also be a transmitter identity associated to the transmitting device. It may also be an RNTI associated to a resource identifier, related to a resource where a scheduling assignment was transmitted, i.e. a scheduling assignment ID. The scheduling assignment ID may sometimes be referred to as sidelink scheduling assignment identity. Different types of RNTI, as described above, may be chosen depending if the data is intended to be broadcasted to any potentially interested receiver, or if it is targeting a subset of receivers, i.e. multicast, or a single receiver, i.e. unicast. In case of broadcast transmission, the RNTI should not be based on a specific receiver identity. The device then generates 120 modulated symbols, e.g. BPSK, QPSK, 16-QAM, etc., and scramble, e.g. complex valued multiplication, the symbols with at least a sequence associated with at least the synchronization source ID. The synchronization source identity may sometimes be referred to as physical layer sidelink synchronization identity. The scrambling sequence may be a QPSK sequence. The synchronization source may be an eNodeB, e.g. serving cell of the transmitter device, or another UE, e.g., a Synchronization Cluster Head controlling/serving the transmitting device. The transmitting device may furthermore be a Cluster Head itself, and thereby the synchronization source. Optionally, prior to transmitting the first message, synchronization signals may be transmitted 130. The sync signal sequence may be associated with the synchronization source identity, or to the identity of the synchronization relayed by the synchronization source. Sync signals may be transmitted prior to the message, or on regular basis, e.g. every 5-500 ms or so. Then the first data block or sequence is transmitted 140 on configured time/frequency resources on a certain carrier frequency. The time/frequency resources used is either pre-configured by standard or configured by the controlling node. For example, one synchronization subframe for D2D may be provided for each periodic instant. The synchronization subframe for D2D may comprise a primary synchronization sequence, e.g. 2 symbols, a physical downlink synchronization channel carrying information to support synchronization management, and a secondary synchronization sequence, e.g. 2 symbols. Optionally, the first data block or sequence comprises scheduling assignments 150 with information about a second data block or sequence. The information may include link adaptation details, modulation details, coding details, diversity and redundancy information, and/or a pointer to a second data block or sequence associated to the transmission. Optionally, a second data message is generated 160. This may be a broadcast, group-cast or a unicast message. Optionally, the data symbols in the second message is scrambled 170 with a scrambling sequence, e.g. QPSK, associated with the transmitting device ID, or with a resource identifier related to the resource where the first data block or sequence was transmitted. Optionally, the second data message is transmitted 180.

Figure 4:
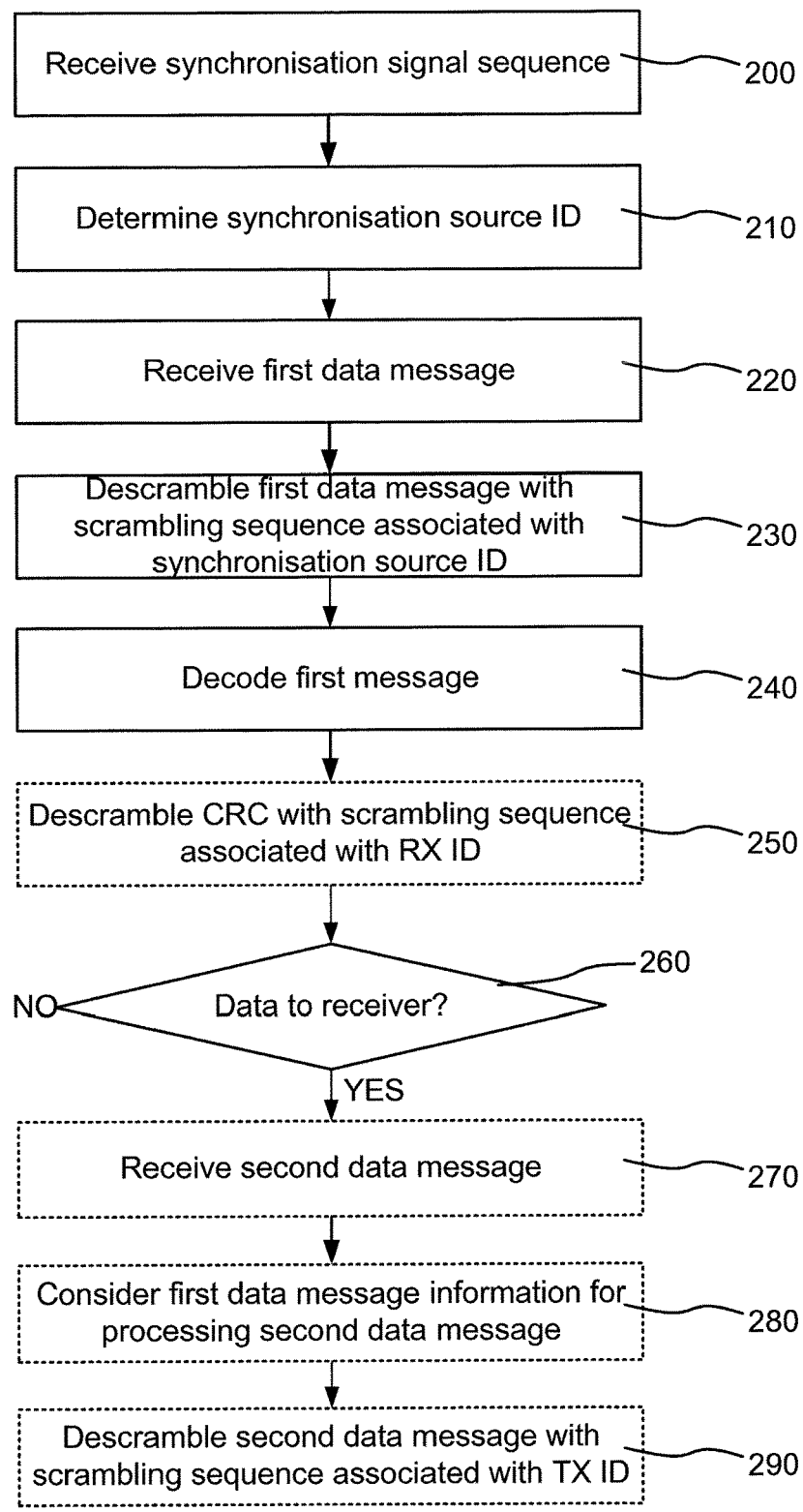
FIG. 4 is a flow chart illustrating methods according to embodiments for the receiver side.

FIG. 4 is a flow chart illustrating methods according to embodiments for the receiver side. Optionally, the receiver receives a sync signal sequence 200 transmitted from the transmitting device. The receiving device may determine 210 a synchronization source ID. The synchronization source identity may sometimes be referred to as physical layer sidelink synchronization identity. This may be determined from the sync signal sequence that is associated with a controlling node ID. The device may determine the synchronization source ID in other ways as well. For instance, the receiving device may have determined the synchronization source ID from a cell search process, e.g. the physical cell ID and sync source ID may be the same thing or linked to each other, via for instance a one to one mapping. The device then receives 220 a first data block or sequence transmitted from a transmitting device. The receiving device then, based on the determined synchronization source ID, descrambles 230 the received first data block or sequence, with the scrambling sequence used that is associated with the synchronization source ID. The mapping between synchronization source ID and the scrambling sequence may be pre-determined by standard and stored in the device. The first message is decoded 240. Optionally, the device descrambles 250 the CRC bits with a scrambling sequence associated with the receiver identity. Again the receiver identity, known to the receiving device, may be a broadcast, group-cast or unicast RNTI. The device determines 260 whether the data is to the receiver or not. For instance, if the CRC is scrambled with a receiver identity, the descrambled CRC indicates a match if the data is destined for the receiving device. If the data is to the receiver, the receiving device may optionally receive 270 a second data sequence transmitted from the transmitting device. Optionally, the receiver retrieves 280, in the first message, information such as second data sequence link adaptation details, modulation details, coding details, diversity and redundancy information, and/or a pointer at where to retrieve a second data block or sequence associated to the transmission. Optionally, the second sequence is descrambled 290 with a scrambling sequence associated with the transmitting device ID.

Figure 5:
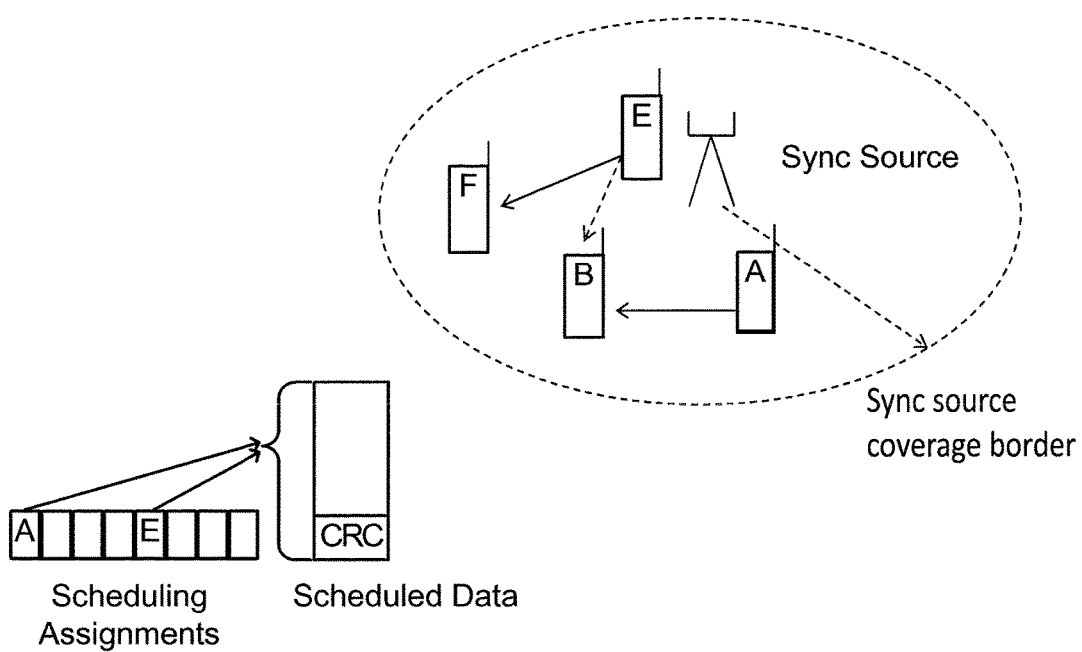
FIG. 5 illustrates a potential contention problem that can be relieved by CRC.

FIG. 5 illustrates a potential contention problem that can be relieved by CRC. Two D2D devices are associated to the same synchronization source. This may mean that their transmitted data sequences are scrambled with the same synchronization source identity. The synchronization source identity may sometimes be referred to as physical layer sidelink synchronization identity. In a non-limiting example, device A is transmitting a scheduling assignment, e.g. in the first data message, at one resource X, and device E is transmitting a scheduling assignment, e.g. first data message, at a different resource Y. If both these scheduling assignments point at the same resource where both device A and device E will transmit data, i.e. second data message, there will be contention. This contention can be resolved via CRC.

In one mode, the scheduling assignments include an RNTI (SA-RNTI) that will be used for scrambling the CRC for the second data message. This enables the receiver to resolve contention and only process the data with a matching CRC from the scheduling assignment.

In a second mode, the scheduling assignments are associated to a resource index (SA-RNTI), describing the resource used for transmitting the resource assignment, typically in relation to a known time reference. For example, assume that the available scheduling assignment resources are associated with a 16-bit resource index, then the second data message is processed in consideration of the resource index associated to the resource where the scheduling assignment was sent.

On the receiver side, the receiver retrieves the SA-RNTI from the first data message, and uses the SA-RNTI for CRC with the decoded second data bits.

Figure 6:
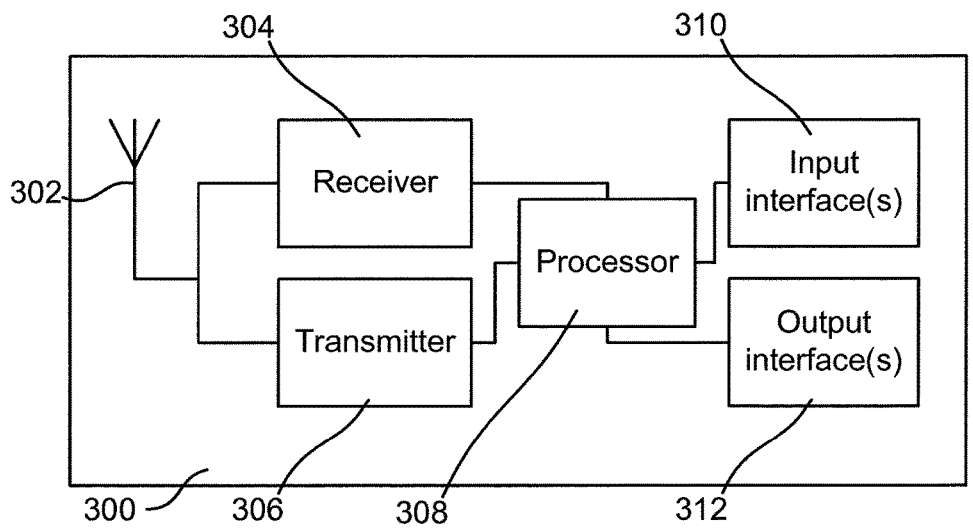
FIG. 6 is a block diagram schematically illustrating a UE according to an embodiment.

FIG. 6 is a block diagram schematically illustrating a UE 300 according to an embodiment. The UE comprises an antenna arrangement 302, a receiver 304 connected to the antenna arrangement 302, a transmitter 306 connected to the antenna arrangement 302, a processing element 308 which may comprise one or more circuits, one or more input interfaces 310 and one or more output interfaces 312. The interfaces 310, 312 can be user interfaces and/or signal interfaces, e.g. electrical or optical. The UE 300 is arranged to operate in a cellular communication network. In particular, by the processing element 308 being arranged to perform the embodiments demonstrated with reference to FIGS. 1 to 5, the UE 300 is capable of communication within a 3GPP LTE network, and in particular LTE Direct, i.e. D2D, communication. The processing element 308 can also fulfill a multitude of tasks, ranging from signal processing to enable reception and transmission since it is connected to the receiver 304 and transmitter 306, executing applications, controlling the interfaces 310, 312, etc.

Figure 7:
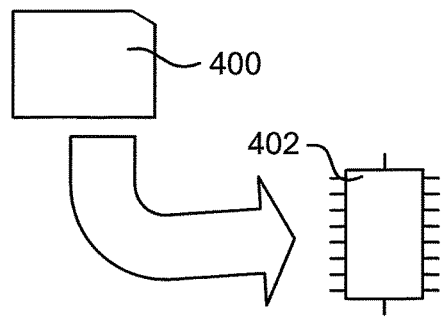
FIG. 7 schematically illustrates a computer-readable medium and a processing device.

The methods according to the present invention are suitable for implementation with aid of processing means, such as computers and/or processors, especially for the case where the processing element 308 demonstrated above comprises a processor handling D2D resource use as discussed above. Therefore, there is provided computer programs, comprising instructions arranged to cause the processing means, processor, or computer to perform the steps of any of the methods according to any of the embodiments described with reference to FIG. 1 to 5. The computer programs preferably comprises program code which is stored on a computer readable medium 400, as illustrated in FIG. 7, which can be loaded and executed by a processing means, processor, or computer 402 to cause it to perform the methods, respectively, according to embodiments of the present invention, preferably as any of the embodiments described with reference to FIGS. 1 to 5. The computer 402 and computer program product 400 can be arranged to execute the program code sequentially where actions of the any of the methods are performed stepwise. The processing means, processor, or computer 402 is preferably what normally is referred to as an embedded system. Thus, the depicted computer readable medium 400 and computer 402 in FIG. 7 should be construed to be for illustrative purposes only to provide understanding of the principle, and not to be construed as any direct illustration of the elements.

The invention claimed is:

1. A method of generation of a first data message and for transmission of the first data message over a wireless channel from a first device-to-device (D2D) enabled cellular communication device to a second D2D enabled cellular communication device, the first D2D enabled cellular communication device being in network coverage of a controlling node, the second D2D enabled cellular communication device being out of network coverage of the controlling node, the method comprising:

scrambling, at the first D2D enabled cellular communication device, an entire first data message, including at least data, with a scrambling sequence associated with a synchronization source identity of the controlling node where the synchronization source identity is associated with physical layer sidelink communication; and after scrambling of the entire first data message, transmitting, to the second D2D enabled cellular communication device, the first data message over the wireless channel using the physical layer sidelink communication.

2. The method of claim 1, wherein the synchronization source is a controlling node to which the first cellular communication device is associated by the first cellular communication device is camping on the controlling node, is served by the camping node or controlled by the controlling node.

3. The method of claim 1, wherein the synchronization source is associated with the first cellular communication device.

4. The method of claim 3, wherein the first data message is transmitted at predetermined frequency/time resources.

5. The method of claim 1, wherein the scrambling sequence associated with a synchronization source identity is derived from a Primary Synchronization Source Identity, PSSID.

6. The method of claim 1, further comprising scrambling a checksum associated with the first data message, wherein the scrambling of the checksum is made with a scrambling sequence associated with an identity of a receiver of the first data message; and then performing the scrambling of the entire first message.

7. The method of claim 6, wherein the checksum is a cyclic redundancy check.

8. The method of claim 6, wherein the identity of the receiver is one of received from the first synchronization source and preconfigured.

9. The method of claim 1, further comprising:

scrambling a second data message with a sequence associated with the transmitter ID of the cellular communication device; and transmitting the second data message over the wireless channel.

10. The method of claim 1, further comprising, prior to any transmission of the first data message, transmitting a synchronization sequence, wherein the synchronization sequence is associated with synchronization source identity of the controlling node.

11. The method of claim 1, wherein the first data message is transmitted at frequency/time resources assigned by the synchronization source.

12. The method of claim 1, wherein the first data message is a scheduling assignment message for device-to-device communication.

13. The method of claim 1, wherein the D2D enabled cellular communication device is arranged to operate with a 3GPP LTE cellular radio access network.

14. A method of receiving at least one data message over a wireless channel and for decoding the at least one data message, the at least one data message being communicated from a first device-to-device (D2D) enabled cellular communication device to a second D2D enabled cellular communication device, the first D2D enabled cellular communication device being in network coverage of a controlling node, the second D2D enabled cellular communication device being out of network coverage of the controlling node, the method comprising:

determining, at the second D2D enabled cellular communication device, a synchronization source identity of the controlling node where the synchronization source identity is associated with physical layer sidelink communication;

descrambling, at the second D2D enabled cellular communication device, an entire first data message including at least data, with a scrambling sequence associated with the synchronization source identity of the controlling node that is associated with the physical layer sidelink communication; and after descrambling the entire first data message, decoding the received first data message.

15. The method of claim 14, where the decoding of the first data message comprises descrambling a checksum with a sequence associated with receiver identity of the second D2D enabled cellular communication device.

16. The method of claim 14, further comprising descrambling a second data message with a scrambling code associated with the determined synchronization source identity.

17. The method of claim 14, wherein a receiver identity of the second D2D enabled cellular communication device is determined from preconfigured capability of the first D2D cellular communication device.

18. The method of claim 14, wherein a receiver identity of the second D2D cellular communication device is received from a second synchronization source.

19. A first communication device for operating with a cellular radio access network and enabled for device-to-device communication, the communication device comprising:

a transceiver configured to one of transmit and receive at least one data message over a wireless channel; and a controller configured to one of generate and decode at least one data message by:

for encoding if the first communication device is in network coverage of a controlling node:

scrambling an entire at least one data message, including at least data, with a scrambling sequence associated with a synchronization source identity of the controlling node where the synchronization source identity is associated with physical layer sidelink communication; and after scrambling of the entire first data message, transmitting, to a second communication device that is out of network coverage of the controlling node, the at least one data message over the wireless channel using the physical layer sidelink communication; and for decoding if the first communication device is out of network coverage of the controlling node:

determining the synchronization source identity of the controlling node where the synchronization source identity is associated with the physical layer sidelink communication;

descrambling a first data message received from the second communication device that is in network coverage of the controlling node, the first data message including the at least data with the scrambling sequence associated with the identity associated with the physical layer sidelink communication; and after descrambling the received first data message, decoding the received at least one data message.

20. A non-transitory computer storage medium storing a computer program comprising instructions which, when executed by a processor of a first communication device for operating with a cellular radio access network and enabled for device-to-device communication, causes the first communication device to perform a method comprising: for encoding if the first communication device is in network coverage of a controlling node: scrambling an entire at least one data message, including at least data, with a scrambling sequence associated with a synchronization source identity of the controlling node where the synchronization source identity is associated with physical layer sidelink communication; and after scrambling of the entire first data message, transmitting, to a second communication device that is out of network coverage of the controlling node, the at least one data message over the wireless channel using the physical layer sidelink communication; and for decoding if the first communication device is out of network coverage of the controlling node: determining the synchronization source identity of the controlling node where the synchronization source identity is associated with the physical layer sidelink communication; descrambling a first data message received from the second communication device that is in network coverage of the controlling node, the first data message including the at least data with the scrambling sequence associated with the identity associated with the physical layer sidelink communication; and after descrambling the received first data message, decoding the received at least one data message.

\* \* \* \* \*